March 16, 1943.  S. M. HUMPHREY ET AL  2,313,941
PRESS WELDER CONSTRUCTION
Filed April 10, 1941  2 Sheets—Sheet 1
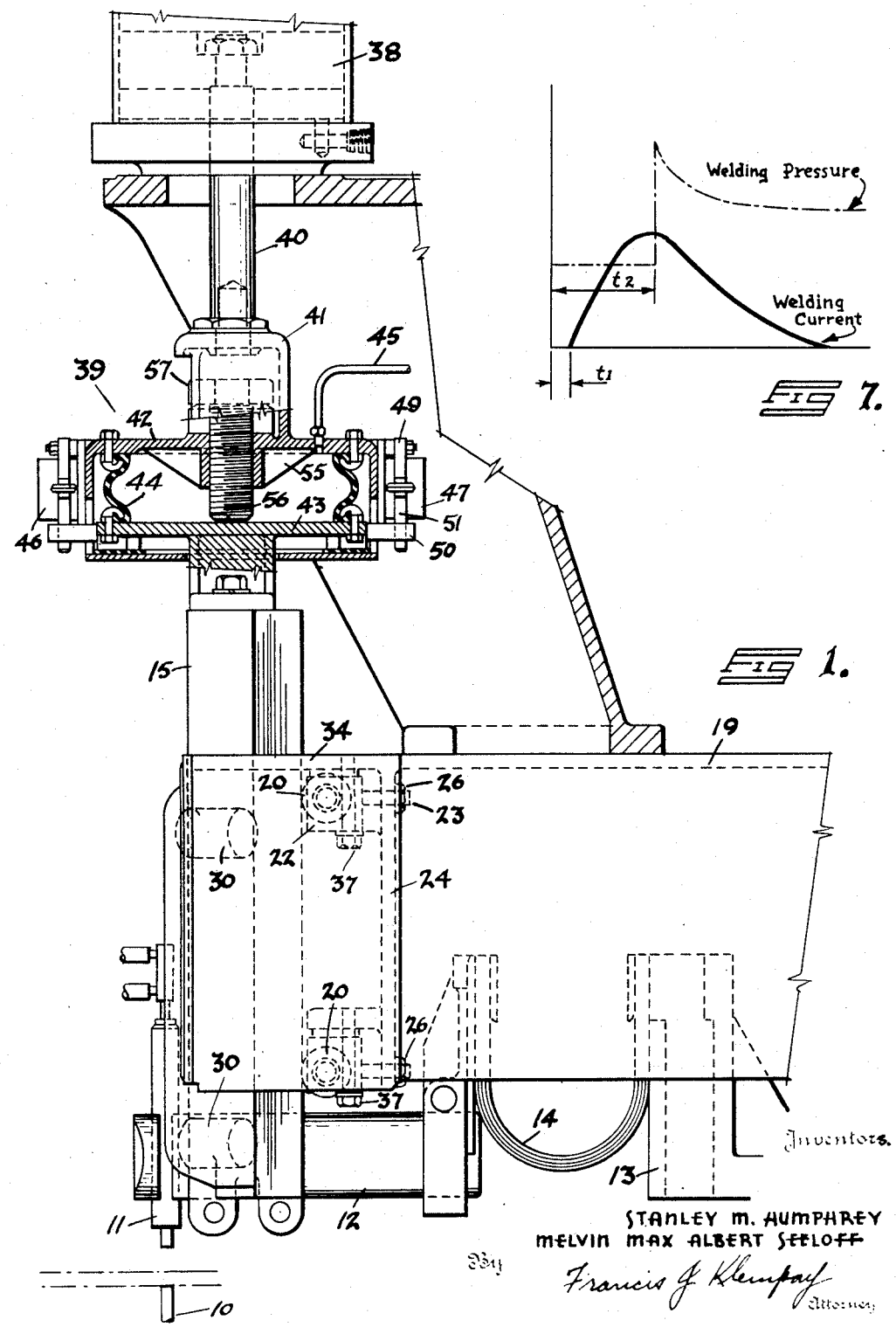
STANLEY M. HUMPHREY
MELVIN MAX ALBERT SEELOFF

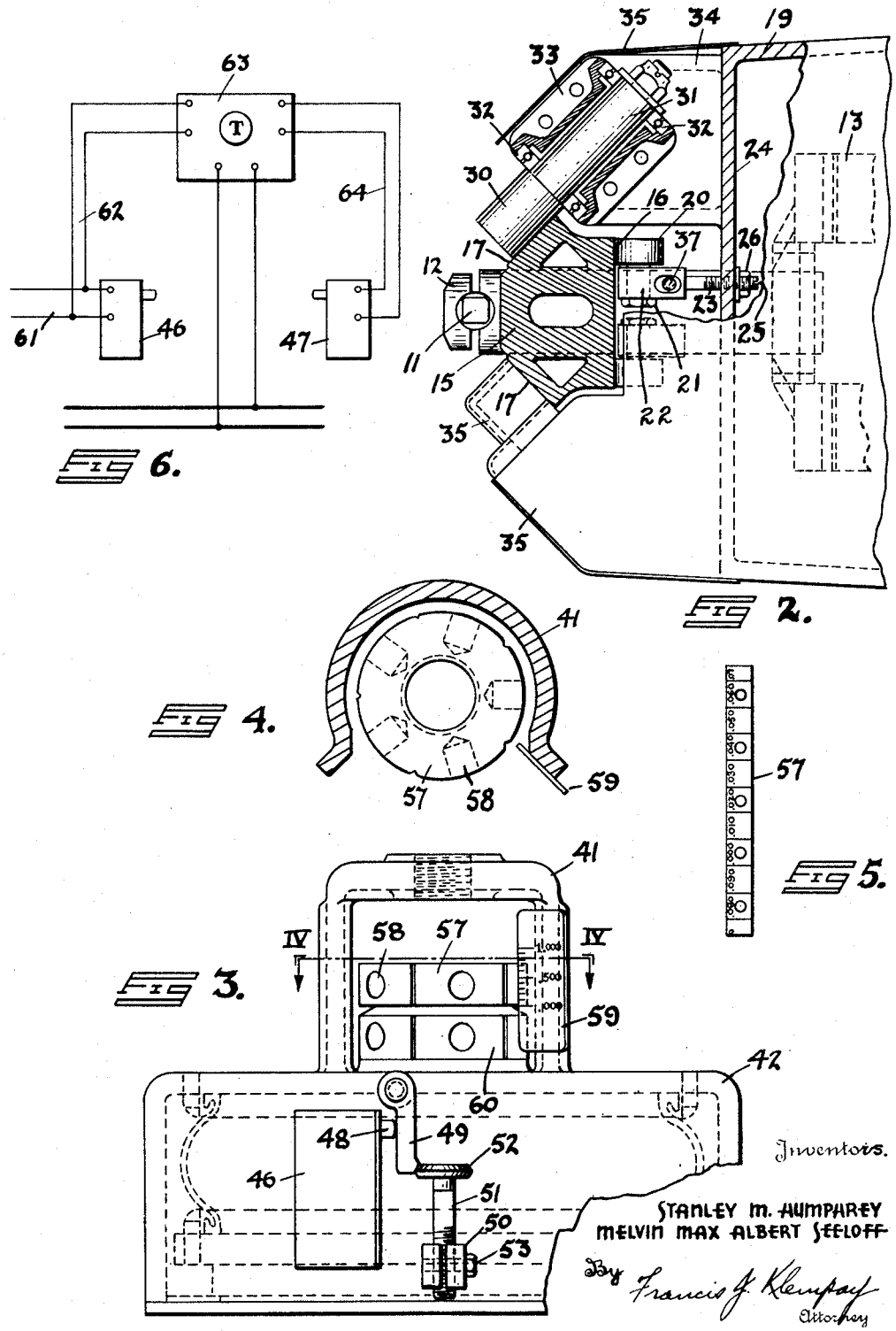

Patented Mar. 16, 1943

2,313,941

UNITED STATES PATENT OFFICE

2,313,941

PRESS WELDER CONSTRUCTION

Stanley M. Humphrey and Melvin Max Albert Seeloff, Warren, Ohio, assignor to The Taylor-Winfield Corporation, Warren, Ohio, a corporation of Ohio Application April 10, 1941, Serial No. 387,878

18 Claims. (Cl. 219—4)

This invention relates to the electric welding art and more particularly to an improved electrode operating mechanism for an electric welding machine of the press or spot welding type. The primary object of the invention is the improvement in the design and operation of the mechanism for moving and applying welding pressure to the movable electrode of the machine whereby the construction of such mechanism will be more compact and less in the way of the work being handled and the operation of the same will result in more uniform welds, less maintenance of the apparatus, and in otherwise improved operating characteristics.

To facilitate the handling of the work relative to the operative parts of the press or spot welder it is desirable that the welding electrodes project from the machine proper in a readily accessible position and it is required that means be provided to slideably support the movable electrode for movement toward and away from the normally fixed electrode of the machine. For this latter purpose it is common practice to provide a vertically extending slide which is operated by suitable mechanical or fluid pressure means and by reason of the offset relation of the electrodes with respect to the longitudinal axis of the slide, the slide must be rigidly restrained against lateral movement on both its front and back faces, and the greater the extent of offset and welding pressure employed the stronger such restraining means must be to prevent excessive deflection and binding of the parts. Heretofore the restraining means engaged the outer face of the slide—projecting outwardly a substantial distance from the same—and to position the electrodes out still further a substantial offset was required between the electrodes and the slide. This condition resulted in the application of a substantial moment tending to bind the slide thereby decreasing the efficiency of the electrode operating mechanism and increasing wear of the parts to such an extent that frequent repair and adjustment was required.

A more specific object of the invention therefore is the provision in a welding machine of the press or spot welding type of an improved slide design and of an improved arrangement for guiding the slide whereby the extent of offset of the electrodes relative to the slide may be substantially reduced and the friction in the operation of the slide decreased.

Another object of the invention is the provision of an improved method and apparatus for moving the electrodes and applying welding pressure therethrough relative to the flow of welding current whereby improved results are obtained in the welding operation. To this end the apparatus includes means to bring the welding electrodes into pressure engagement with the work, to maintain a constant predetermined pressure on the work immediately prior to the initiation of the flow of welding current and during a pre-selected portion of such flow, and thereafter but while said current is still flowing to said electrodes, to impart an impact load thus instantly increasing the pressure exerted by the electrodes on the work.

Yet another object of the invention is the provision of an improved construction for the operating mechanism for the movable electrodes which mechanism employs a collapsible fluid pressure containing member which is maintained under constant pressure whereby the pressure exerted by said electrodes is maintained substantially constant during the collapse of said member but which construction nevertheless permits the locating of the movable electrode close to the center line of welding pressure application. Further objects of the invention include the provision of instrumentalities, in a welding machine having the operating characteristics enumerated above, to vary the time of application of the impact relative to the flow of welding current and to vary the extent of pressure existing between the electrodes before the point of impact, at the point of impact, and after the point of impact. For this purpose and to effect a more intelligent control of the operation of the machine, means is provided to measure the time interval between initiation of the flow of welding current and the application of the impact.

These and other objects and advantages of the invention will become apparent from a consideration of the following detailed specification and the accompanying drawings wherein there is specifically disclosed a preferred embodiment of the invention.

In the drawings:

Figure 1 is a side view, partly in section, of an operating mechanism for the movable electrode of a press type welding machine constructed in accordance with the principles of the invention;

Figure 2 is a plan view, partly in section, of the apparatus of Figure 1;

Figure 3 is an enlarged front elevation of a portion of the apparatus of Figure 1;

Figure 4 is a horizontal section along the line IV—IV of Figure 3;

Figure 5 is a developed view of a screw adjusting collar shown in Figures 3 and 4;

Figure 6 is a schematic diagram of a portion of the control circuit; and

Figure 7 is a diagram showing a representative correlation of the welding pressure and welding current by the apparatus.

Referring to Figure 1 of the drawings, reference numeral 10 designates the tip of the normally fixed electrode of the apparatus and numeral 11 designates the movable electrode of the machine. Electrode 11 is, in accordance with usual practice, carried by the outer end of a horn 12 which is electrically connected with one of the terminals 13 of the welding transformer secondary by means of a flexible connection 14. Horn 12 is clamped rigidly to the lower end of a slide 15 shown in section in Figure 2. It will be observed that slide 15 is provided with a plane rear face 16, a plane front face generally parallel with the rear face and with obliquely disposed surfaces 17, extending backward from the front face of the slide.

Slide 15 is guided between anti-frictionally mounted rolls which are supported from a bracket 19 extended outwardly from the front wall of the principal welding machine housing. Four rolls 20 engage the rear face 16 of the slide 15 and each of these rolls may consist simply of the outer race of an anti-friction bearing which is mounted on the outer end of a pin 21. Pins 21 are in turn carried by blocks 22 which are adjustably mounted on the bracket 19 for movement towards and away from the face 16. A screw 23 is rotatably connected with each of the blocks 22, such connection preventing axial movement of the screw relative to the block in a manner well understood. These screws have screw-threaded connection with the web 24 of the bracket 19. Suitable means, as the slot 25, are provided to rotate the screws individually and it should be apparent that rotation of the screws will move the respective blocks 22 towards and away from the face 16. Lock nuts 26 are provided to lock the screws 23 in adjusted positions.

Each of the oblique faces 17 of the slide 15 is adapted to abut against a pair of vertically spaced rolls 30 each of which is carried on the outer end of a shaft 31 which is journaled by means of spaced anti-friction bearings 32 in a journal block 33 carried by a shelf 34 forming part of the bracket 19. It should be observed that the axes of the shafts 31 are obliquely disposed in a manner substantially parallel with the faces 17 of the slide 15 so that the rolls 30 will be in line contact with the faces. Sheet metal covers 35 enclose the sides of the journal blocks 33 and encase the rolls 30. It should be understood that four rolls 30 are employed in the machine, two on each side of the center of the slide 15. The lower guide rollers 30 are positioned substantially opposite the longitudinal axis of the horn 12 when it is in upper position as shown in Figure 1 of the drawings. The rolls 20 are also vertically spaced as indicated in Figure 1.

In practice, the anti-friction guiding rolls 20 and 30 are preloaded by first loosening the clamping bolts 37, which pass through elongated apertures in the blocks 22 and are operative to clamp the blocks in adjusted positions, and then manipulating screws 23 to force the rolls 20 into pressure engagement with the guide face 16. This of course also forces the guide faces 17 into pressure contact with the rolls 30 and when the desired tightness is obtained the parts may be locked in position by drawing up bolts 37 and lock nuts 26. In this condition of the parts the slide 15 is definitely constrained against any lateral or twisting motion but is nevertheless free to move longitudinally and such movement may be accomplished with little force due to the anti-friction mounting of the guide rolls. In operation, as the electrode 11 engages the work upon downward movement of the slide 15 by means to be hereinafter described, the slide will abruptly tend to move about a horizontal axis due to the moment created by the offset relation between the center of the slide and the electrode but such movement will be opposed by the upper guide rolls 20 and the lower front guide rolls 30. As these have been previously loaded the slide 15 will not begin such movement and consequently the parts will not be subjected to shocks or jars as would be the case if there were any play in the guide assembly. From time to time the bearing loading may be readjusted to compensate for wear.

By referring to Figures 1 and 2 it should be apparent that the triangular arrangement of the guiding rolls 20 and 30 enables the electrode 11 to be coupled closely to the geometrical center of the slide 15. In fact the electrode 11 with its attendant cooling fluid connections may be positioned immediately outward of the front face of the slide in which position it is between the ends of the guide rolls 30. This makes the electrodes readily accessible for work and maintenance while keeping the extent of offset to a minimum whereby deflection and binding of the parts is reduced to a minimum. Consequently the operating efficiency of the mechanism is improved.

Slide 15 is operated by an air cylinder 38 through an air lock 39. The air cylinder 38 is of the retractable type and is identical in construction and operation with that shown in the applicant Stanley M. Humphrey's co-pending application Ser. #306,127, filed Nov. 25, 1939. As disclosed in said co-pending application the operating cylinder has a normal operating stroke and additional means is provided to automatically and substantially lengthen the stroke to enable the electrodes to be moved far apart for the purpose of allowing odd shaped articles to be inserted therebetween and for other purposes.

Cylinder 38 has its operating piston rod 40 rigidly connected to the boss 41 of the housing 42 of the air lock 39. Slidably received in the housing 42 is a plate 43 which is rigidly connected with slide 15. Interconnecting the top wall of the housing 42 and the plate 43 is an annular flexible member 44 providing in effect an expansible bellows, the operation of which will be explained below. A conduit 45 supplies air under pressure to the bellows and in practice this conduit may be connected with an air tank or other apparatus which will maintain the pressure in the bellows constant during the collapsing thereof in the operation of the welding machine.

Two switches 46 and 47 of the precision type commonly termed "micro" switches are supported on the housing 42, each switch being provided with an operating member 48 adapted to be engaged by an arm 49 pivoted on the housing 42. Extending outwardly from plate 43 through vertically extending slots in the side wall of housing 42 are the brackets 50, one adjacent each of the switches.

Screw-threadedly received in each of the brackets 50 is a stem 51 to the upper end of which is attached a conical surface 52 for engaging the adjacent lever 49. The ends of the brackets 50 are bifurcated as shown in Figure 3 and a clamp bolt 53 securely locks the stem 51 in adjusted position relative to the bracket. Switches 46 and 47 are of the snap acting type and by adjusting the stem 51 it is possible to have the switches close at precisely the desired vertical positions of the plate 43 relative to the housing 42.

Screw-threadedly received in a downward extending boss 55 formed integral with the upper wall of the housing 42 is a bolt 56 having a graduated head 57 provided with circumferentially spaced recesses 58 to which a spanner wrench may be applied for the purpose of rotating the screw. A scale 59 is attached to one edge of the opening in the boss 41 and as shown in Figure 5 the head 57 is sub-divided circumferentially so that the two taken together will provide a vernier indication of the adjustment of the screw 56. A lock nut 60 is provided to retain the bolt 56 in adjusted position. The lower end of bolt 56 is positioned normally above the upper surface of plate 43 and it should be obvious that upon collapsing of the bellows above described and upward movement of the plate 43 a predetermined interval relative to the housing 42 the lower end of the bolt 56 will engage the plate 43 thus preventing further collapsing of the bellows.

The operator 52 for switch 46 is so adjusted that the switch will close upon collapsing of the bellows and since pressure is maintained in the bellows this cannot occur until the electrode 11 is brought into engagement with the work and welding pressure is applied by actuation of cylinder 38. The operator for switch 47 is so adjusted that it will close at the instant the lower end of bolt 56 reaches plate 43. It should be understood that when the machine is at rest the operating piston in cylinder 38 is in its upper position while the bellows 39 is fully extended. To initiate the welding cycle fluid pressure is admitted to above the said piston and the bellows and slide 15 move downward as a unit until electrode 11 engages the work after which the bellows commences to collapse.

Referring to Figure 6, switch 46 closes a circuit 61 which through well known means, not shown, initiates the flow of welding current to the electrodes. Switch 46 also closes a circuit 62 which initiates operation of the time indicator 63 so that an accurate indication of the time interval between the start of the flow of welding current and the instant of impact between the bolt 56 and the plate 43 may be obtained. This feature is of advantage in analyzing the operation of the machine and enables various adjustments thereof including the positioning of the bolt 56 to be more intelligently directed.

During the operation of the apparatus and after the admission of fluid pressure to the cylinder 38 the parts including the piston in said cylinder, the rod 40, and the air lock 39 move downward with considerable velocity and after slide 15 and plate 43 is stopped the piston rod and housing 42 of the air lock continue their downward movement until the bolt 56 engages the plate 43. At this time an impact or shock is applied to the slide 15 and consequently to the electrode 11 by reason of the abrupt stoppage of movement of the piston, rod 40, and housing 42 and it has been found that this impact applied to the work at the time when it occurs improves the quality of the weld without substantially increasing the physical deformation of the surfaces of the work being welded.

Referring to the graph in Figure 7 which illustrates a representative welding cycle, the vertical axis represents current and pressure beginning from zero and the horizontal axis represents time beginning at the point the electrode 11 first engages the work at the start of a welding cycle. Due to the above described action of the air lock, the welding pressure remains constant although the bellows is collapsing and upon expiration of time $t1$ switch 46 is closed and welding current begins to flow. At the expiration of time $t2$ bolt 56 impacts against plate 43 and the welding pressure abruptly rises as indicated and thereafter recedes to a substantially constant value determined by the pressure of the air applied to cylinder 38. By retracting bolt 56 the time $t2$ may be lengthened and the impact pressure substantially increased due to the higher velocity acquired by the parts 40, 41 and 42. By adjusting the bolt oppositely time $t2$ and the impact pressure may be decreased.

By adjusting the position of the proper operator 52, time $t1$ may be varied so that the time of the impact relative to the welding current supply may be varied regardless of whether or not the time and magnitude of the impact is varied by the manipulation of the bolt 56. This provides a further control over the variable factors entering into the welding operation whereby the efficiency of the machine for specific purposes may be increased.

It should now be apparent that we have provided an improved electrode operating mechanism for a welding machine which accomplishes the objects initially set out. The movable electrode of the machine is more rigidly carried while frictional losses in actuating the same are kept low. The accessibility of the electrodes to the work is improved and the extent of offset of the electrodes with respect to the center of the slide or quill through which the welding pressure is conveyed is reduced. It should be observed that a contributing feature to the above results is the positioning of the air lock at the upper end of the slide or quill instead of at the bottom thereof as shown in the aforesaid copending application. By making the slide or quill hollow as indicated the weight and consequently the inertia of the moving parts connected with the movable electrode is kept to a minimum whereby the electrode will follow through readily in response to pressure and upon application of the welding current to effect uniform and satisfactory welds.

The bellows type air lock, as shown herein, provides a frictionless pressure device having low operating inertia for applying the required welding pressure as explained above and in addition provides a further substantial advantage of serving as a universal joint between the member 15 and the piston rod 40, which universal coupling will further aid in preventing any binding between the member 15 and its guiding rollers.

An important aspect of the present invention is the manner in which various factors effecting the quality and uniformity of the welds may be controlled. Time $t1$ may be varied by adjusting the position of the operator for switch 46 and time $t2$ may readily be controlled by adjusting bolt 56. These features taken together allow an accurate correlation to be maintained between the peak or other part of the flow of welding current and the instant of impact. Initial welding pressure may be varied, of course, by changing the pressure in the bellows or air lock and the severity of impact is controlled by the interval between parts 43 and 56 when the air lock or bellows is in its expanded condition.

The above specifically described embodiment of the invention should be considered as illustrative only as obviously many changes may be made therein without departing from the spirit or scope of the invention. For example, the slide or quill and its mounting may be used with other types of driving means and in the combination disclosed other types of air locks may be employed in place of the bellows type illustrated. Reference should therefore be had to the appended claims in determining the scope of the invention.

What we claim is:

1. A welding machine comprising in combination a bracket adapted to be secured to the principal housing of the machine and to extend outwardly from the front face thereof, a normally fixed electrode, a movable electrode, a slide supporting said movable electrode for rectilinear movement toward and away from said fixed electrode and having oppositely disposed guide surfaces thereon, and a plurality of vertically and laterally spaced antifrictionally mounted guide rolls carried by said bracket and engaging the said opposite surfaces of said slide.

2. Welding apparatus comprising in combination, a normally fixed electrode, a movable electrode, a slide supporting said movable electrode for movement toward and away from said fixed electrode, said slide having rearwardly inclined bearing surfaces, means to oppose lateral movement of said slide in one direction, and antifrictionally mounted rolls engaging said surfaces to oppose lateral movement of said slide in the other directions.

3. Welding apparatus comprising in combination, a normally fixed electrode, a movable electrode, a slide supporting said movable electrode for movement toward and away from said fixed electrode, the said slide having a rearwardly disposed guide surface and spaced rearwardly inclined front bearing surfaces, spaced antifrictionally mounted rolls engaging each of said front bearing surfaces, and spaced anti-frictionally mounted rolls engaging said rearwardly disposed surface.

4. Apparatus according to claim 3 further including means to move said second mentioned rolls into pressure contact with said rearwardly disposed surface.

5. Welding apparatus comprising in combination, a normally fixed electrode, a movable electrode, a slide supporting said movable electrode for movement toward and away from said fixed electrode, said slide having substantially parallel front and rear surfaces, rearwardly inclined surfaces extending outwardly from the side edges of said front surface, spaced anti-frictionally mounted rollers engaging each of said inclined surfaces, and spaced antifrictionally mounted rolls engaging said rear surface.

6. Apparatus according to claim 5 further including means to move said last mentioned rolls into pressure contact with said rear surface.

7. Apparatus according to claim 5 in which said first mentioned rolls are carried by the outer free ends of shafts each journaled in spaced anti-friction bearings positioned at the side of said slide.

8. Apparatus according to claim 5 in which said first mentioned rolls are carried by the outer free ends of shafts each journaled in spaced anti-friction bearings positioned at the side of said slide, and means to move said second mentioned rolls into pressure engagement with said rear surface.

9. Welding apparatus comprising in combination a normally fixed electrode, a movable electrode, a slide supporting said movable electrode for rectilinear movement toward and away from said fixed electrode, means to move said slide, a collapsible bellows interposed between said means and slide whereby pressure exerted by said means on said movable electrode passes through said bellows, and means to maintain a predetermined fluid pressure in said bellows.

10. Apparatus according to claim 9 further including a switch to initiate the flow of welding current to said electrodes, and means operable upon collapsing of said bellows during operation of said first mentioned means to actuate said switch.

11. Apparatus according to claim 9 further including means to limit the extent of collapsing of said bellows whereby upon actuation of said means to move, the initial pressure exerted on the movable electrode will be determined by the pressure of the fluid in the bellows and the final pressure exerted on the movable electrode will be determined by the pressure exerted by said moving means.

12. Welding apparatus comprising in combination a normally fixed electrode, a movable electrode, means to move said movable electrode toward and away from said fixed electrode, a collapsible bellows interposed between said means to move and said movable electrode, means to maintain a predetermined fluid pressure in said bellows, and means to limit the extent of collapsing of said bellows whereby upon actuation of said means to move, an impact pressure will be exerted on the movable electrode intermediate in the cycle between the initial pressure determined by the pressure of said fluid and the final pressure determined by the force exerted by said moving means.

13. Apparatus according to claim 12 further including means to adjust said limiting means whereby the extent of collapsing of said bellows and consequently the severity of said impact may be varied.

14. Apparatus according to claim 12 further including a switch to initiate the flow of welding current to said electrodes, and means to actuate said switch when said bellows has collapsed a preselected extent.

15. Apparatus according to claim 12 further including a switch to initiate the flow of welding current to said electrodes, means to actuate said switch when said bellows has collapsed a preselected extent, and means to adjust said limiting means whereby the extent of collapsing of said bellows and consequently the time and severity of said impact may be varied.

16. Apparatus according to claim 12 further including a switch to initiate the flow of welding current to said electrodes, means to actuate said switch when said bellows has collapsed a preselected extent, a second switch adapted to be actuated when said bellows has collapsed its limited extent, and means to measure the time interval between actuation of said switches.

17. Apparatus according to claim 12 further including a switch to initiate the flow of welding current to said electrodes, means to actuate said switch when said bellows has collapsed a preselected extent, means to adjust said limiting means whereby the extent of collapsing of said bellows and consequently the time and severity of said impact may be varied, a second switch adapted to be actuated simultaneously with occurrence of said impact, and means to measure the time interval between actuation of said switches.

18. Welding apparatus comprising in combination a normally fixed electrode, a movable electrode, means to move said movable electrode toward and away from said fixed electrode, a fluid pressure filled collapsible member interposed between said means to move and said movable electrode, means to maintain a predetermined fluid pressure in said member, and means to limit the extent of collapsing of said member whereby upon actuation of said means to move, an impact pressure will be exerted on the movable electrode intermediate in the cycle between the initial pressure determined by the pressure of said fluid and the final pressure determined by the force exerted by said moving means.

STANLEY M. HUMPHREY.
MELVIN MAX ALBERT SEELOFF.